Patented Mar. 14, 1950

2,500,894

UNITED STATES PATENT OFFICE 2,500,894

DISTILLATION OF VOLATILE MONOMERIC MATERIALS FROM AQUEOUS POLYMER DISPERSIONS WHILE REDUCING FOAM FORMATION BY THE PRESENCE OF ACETIC ACID

David Craig, Silver Lake, Ohio, assignor to The B. F. Goodrich Company, New York, N. Y., a corporation of New York No Drawing. Original application September 23, 1943, Serial No. 503,535. Divided and this application June 19, 1946, Serial No. 677,914

3 Claims. (Cl. 202—57)

This invention relates to the removal and recovery by distillation of volatile materials from aqueous polymer dispersions and to a method whereby such distillations may be effected with improved efficiency and economy. More particularly the invention relates to a method of reducing or depressing the formation of foam during the removal by steam distillation of volatile steam-distillable substances from soap-containing aqueous polymer dispersions. Still more particularly, the invention is directed to a method of reducing foam formation during the steam distillation of monomeric styrene from synthetic rubber latices prepared by the incomplete polymerization of butadiene-1,3 and styrene in aqueous emulsion in the presence of soap.

In the production of synthetic rubber by the emulsion polymerization of mixtures of butadiene-1,3 and styrene, or of other mixtures of monomers comprising a butadiene-1,3 hydrocarbon and a monomer copolymerizable therewith in aqueous emulsion, the mixed monomers are emulsified in an aqueous solution of soap as an emulsifying agent; other materials including polymerization initiators and catalysts, which initiate and speed up the polymerization, and polymerization modifiers, which improve the plasticity and solubility of the product, are included in the emulsion and polymerization is then effected by agitating the emulsion at a temperature of about 20 to 80° C. While the polymerization may be continued until substantially all of the monomers are converted into rubbery copolymers, it is ordinarily desirable, for a number of reasons, to terminate the polymerization after from 60 to 95% of the monomers have been converted into polymer. This prevention of further polymerization is accomplished, and at the same time oxidation and degradation of the copolymer produced is prevented, by adding a polymerization inhibitor or anti-oxidant such as a phenol or aromatic amine. It is then necessary to remove the unpolymerized monomers from the resulting synthetic rubber latex, in order both to recover the monomers and to produce the desired type of latex, before further processing of the latex into synthetic rubber. The unpolymerized butadiene-1,3, which is quite volatile, is easily removed simply by subjecting the latex to vacuum, but the unpolymerized styrene, which is somewhat less volatile, is more difficult to remove and must ordinarily be steam-distilled from the latex.

In such steam distillation, however, numerous difficulties have arisen due to the fact that the presence of the soap renders the latex quite foamy. Thus, the formation of foam during steam distillation not only seriously impedes the distillation making the distillation a slow and laborious process but also frequently becomes so great that the capacity of the equipment used is exceeded resulting in loss of material and delay in carrying out the process. Moreover, the amount of foam produced has been found to vary considerably with the precise nature of the latex used, being dependent among other things upon the nature and concentration of emulsifying agents, polymerization modifiers, polymerization inhibitors, and other substances used in the polymerization process, the degree to which the monomers have been converted into polymers and the particle size of the polymer in the latex. And, unfortunately, foaming is most pronounced when certain of the most effective polymerization procedures are used. Furthermore, the peculiar foaming encountered, being dependent upon such a wide variety of conditions, has been found generally not be alleviated by conventional foam-breaking methods used in other more or less unrelated processes.

I have now discovered that foaming during distillation processes to remove monomeric material and other volatile substances from synthetic rubber latices and other soap-containing aqueous polymer dispersions may be substantially reduced by the inclusion of acetic acid in the latex during the distillation.

Water-soluble inorganic and organic acid salts drogen ion concentration greater than that of water (pH greater than seven) but less than that produced by the dissociation of strong acids (dissociation constant of more than $1 \times 10^{-2}$) may also be employed in connection with acetic acid thereby forming a buffer system. Examples of such acid salts include monosodium dihydrogen phosphate, sodium hydrogen sulfite, the monosodium salt of oxalic acid and the like.

The amount of the acetic acid foam-depressant to be included in the latex or other aqueous polymer dispersion during its distillation to remove volatile substances therefrom may be varied widely depending on the nature of the dispersion being treated, particularly the dispersed materials, emulsifying agents and other substances present therein; and the degree to which foaming is to be depressed. However, since the presence of large amounts of acetic acid in aqueous polymer dispersions containing a saponaceous emulsifying or dispersing agent, particularly the soapy dispersions ordinarily encountered, results in coagulation of the dispersion and separation of aggregates of polymer, it is essential that the amount of acetic acid employed be an amount insufficient to coagulate the dispersion. In general, amounts of acetic acid less than about 2% by weight, based on the dry polymer content of the dispersion, do not produce coagulation and may be employed. In case the dispersion is a soap-containing synthetic rubber latex prepared by the incomplete emulsion polymerization of a monomer mixture of butadiene-1,3 and styrene and it is desired to steam distill the unpolymerized styrene therefrom, foaming during distillation is sufficiently repressed when a sufficient amount of the foam depressant is included to reduce the pH of the latex from 0.2 to 2.0 pH units, this being done by the inclusion in the latex of about 1% by weight or less of the acetic acid based on the polymer content of the latex.

The inclusion of the foam depressant in the aqueous polymer dispersion is ordinarily most conveniently accomplished simply by adding, with stirring, the desired amount of the acetic acid or an aqueous solution thereof to the dispersion just prior to carrying out the distillation process. However, other methods and procedures for accomplishing the result may also be employed. For example, instead of adding the acid to the dispersion just prior to carrying out the distillation, it may be added during the distillation, as at the top of a distillation tower, or, in some instances, where the dispersion is prepared by emulsion polymerization, the acid may be present during the polymerization process thereby producing a non-foamy dispersion. Another alternative consists in forming the acid in situ by including in the dispersion a salt or ester of the acid which hydrolyzes during the distillation to liberate the acid.

In the practice of the invention foaming is substantially reduced by the use of acetic acid foam-depressants in any of the various distillation processes known to the art for removing volatile substances from soap-containing aqueous polymer dispersions. The distillation process may be a batch distillation process or a continuous distillation process carried out in a suitable column or tower such as a perforated-plate or bubble-cap column; it may be carried out at any suitable pressure and temperature; and the use of steam may or may not be employed. In the removal of monomeric styrene from synthetic rubber latices prepared by the incomplete polymerization in a soapy emulsion of a mixture of butadiene-1,3 and styrene, by steam distilling the styrene from the latex, the distillation is ordinarily accomplished by passing the latex downward through a stripping column equipped with bubble-cap or perforated plates, passing steam upward through the column and recovering a distillate comprising monomeric styrene and water at the top of the column. A particularly useful embodiment of the invention constitutes the use of acetic acid foam-depressants in such a process.

To illustrate the reduction in foaming brought about by the use of acetic acid the data of Table I is presented. The "foaming index" listed in the table is obtained by placing a 150 gram sample of latex in a 500 ml. three necked distillation flask connected through a 200 ml. foam-head to a condenser and distillate receiver, evacuating the flask to drive off the butadiene-1,3, introducing steam into the distillation flask and measuring the time interval between the introduction of steam and the formation of the second drop of distillate. Very foamy latices on the introduction of steam will foam to such an extent that the distillation flask and part of the foam-head are filled with a very stable foam consequently requiring several minutes before distillation starts; conversely, in less foamy latices lesser time intervals are required for distillation to start. The latices listed in the table are all butadiene-1,3 styrene copolymer synthetic rubber latices prepared by polymerizing to an extent of about 75% monomer conversion in an aqueous emulsion containing soap as the emulsifying agent, using the polymerization modifiers (M) and polymerization inhibitors (I), if any, listed. The foam depressants used and their concentration in per cent of polymer content of the latex are also listed.

Table I

| Latex | Foam Depressant | Concentration of foam depressant [1] | Foaming index, minutes |
| --- | --- | --- | --- |
| A {(M)=triisobutyl mercaptan. (I)=None | None | | 13.0 |
| (A) | Acetic acid | 0.2 | 3.8 |
| (C) {(M)=lorol mercaptan (I)=hydroquinone | None | | 10.0 |
| (C) | Acetic acid / NaH$_2$PO$_4$ | 0.5 / 1.0 | 2.5 |

[1] Per cent on polymer content of latex.

It is evident from the table that in each case the presence of the acetic acid brings about a lowering of the amount of foam produced.

While the invention has been described with specific application to the steam-distillation of styrene from certain especially foamy butadiene-1,3 styrene synthetic rubber latices, it is to be understood that the invention is by no means so limited. Thus, instead of the butadiene-1,3 styrene latices employed in the examples, the invention may be applied to the removal of styrene from other such latices prepared by emulsion polymerization using soaps as emulsifying agents; and, if desired, in the presence of polymerization modifiers, polymerization initiators etc.; and, if desired, terminated by the addition of polymerization inhibitors or antioxidants. Emulsifying agents which may be used include, in addition to water-soluble fatty acid soaps such a sodium oleate, sodium stearate, sodium myristate and the like, other soapy materials such as soaps of rosin acids and the like, and mixtures of any of these. Polymerization modifiers which may be used include aliphatic mercaptans of the type used in the specific examples such as "lorol" mercaptan, triisobutyl mercaptan, cetyl mercaptan, terpene mercaptans, kerosene mercaptans and other mercaptans of the formula R—SH where R is an aliphatic, heterocyclic, alicyclic or aromatic radical which may contain substituent groups such as halogen, carboxy, alkoxy, nitro, carbalkoxy, thioether and the like; and other sulfur-containing organic compounds such as the sulfides and polysulfides of such mercaptans, the xanthogens, thioxanthogens and dixanthogens, thiazyl disulfides, thiazoles and the like. Polymerization initiators which may be used include the per-compounds such as potassium persulfate, sodium perborate, benzoyl peroxide, hydrogen peroxide, diacyl peroxides and the like and any other of the well-known polymerization initiators. Polymerization inhibitors which are added to stop the polymerization and which also often serve as antioxidants or age-resisters for the synthetic rubber, include principally aromatic amines and phenols such as hydroquinone, catechol, p-amino phenol, beta-naphthol, diphenyl amine, phenyl beta-naphthylamine, p-phenylene diamine and the like, and also other inhibitors such as tetramethyl thiuram monosulfide. Moreover, various other additions and procedures known to the art of emulsion polymerization may be employed and the latices so obtained used in the present invention.

Furthermore, the invention may be applied to the distillation of various other monomers than styrene from various other synthetic rubber latices. For example, various synthetic rubber latices prepared by the emulsion polymerization of any butadiene-1,3 hydrocarbons such as butadiene-1,3, isoprene, 2,3-dimethyl butadiene-1,3, piperylene, methyl pentadiene or other open-chain conjugated dienes such as 2-chlorobutadiene-1,3, 2-methoxy butadiene-1,3, 2-cyano-butadiene-1,3 and the like either alone, in admixture with each other or with copolymerizable compounds such as styrene, acrylonitrile, methyl acrylate, methyl methacrylate, isobutylene, methyl vinyl ketone, methyl vinyl ether, vinylidene chloride, diethyl maleate and the like, may be distilled either with steam or by vacuum distillation to remove unpolymerized volatile monomers or other volatile substances which may be present or to concentrate the dispersion by distilling off a part of the water, and the method of this invention applied thereto.

Having disclosed the invention broadly it is not intended that the invention be limited except by the spirit and scope of the appended claims.

This application is a division of my copending application Ser. No. 503,535 filed Sept. 23, 1943, now U. S. Patent 2,432,386 issued Dec. 9, 1947.

I claim:

1. In a process of steam-distilling an unpolymerized steam-distillable monomer from an aqueous polymer dispersion prepared by the incomplete polymerization of monomeric material comprising said steam-distillable monomer in an aqueous emulsion in the presence of an emulsifying agent selected from the class consisting of fatty acid and rosin acid soaps, the method of reducing the formation of foam during the distillation which comprises including in the said dispersion prior to the distillation an amount of acetic acid insufficient to coagulate the dispersion.

2. In a process of steam-distilling monomeric styrene from a synthetic rubber latex prepared by the incomplete polymerization of a mixture of butadiene-1,3 and styrene in an aqueous emulsion in the presence of a fatty acid soap, the method of reducing the formation of foam during the distillation which comprises adding to said latex prior to the distillation an amount of acetic acid insufficient to coagulate the dispersion.

3. The method of recovering monomeric styrene from a synthetic rubber latex prepared by polymerizing, in an aqueous emulsion containing a fatty acid soap and a mercaptan, a mixture of butadiene-1,3 and styrene until from 60 to 95% of the monomers are converted into polymer and then adding a polymerization inhibitor selected from the class consisting of aromatic amines and phenols, which comprises adding to said latex an amount of acetic acid insufficient to coagulate the latex, passing the latex downward through a stripping column, passing steam upward through the column, and recovering a distillate comprising monomeric styrene and water at the top of the column, the said method being characterized by reduced foam formation in the column during distillation.

DAVID CRAIG.

REFERENCES CITED

The following references are of record in the file of this patent:

UNITED STATES PATENTS

| Number | Name | Date |
| --- | --- | --- |
| 2,357,861 | Wilson | Sept. 12, 1944 |
| 2,366,325 | Fryling | Jan. 2, 1945 |
| 2,366,460 | Semon | Jan. 2, 1945 |
| 2,379,268 | Zimmer | June 26, 1945 |
| 2,387,385 | Clifford | Oct. 23, 1945 |
| 2,409,915 | Vanderbilt | Oct. 22, 1946 |
| 2,426,127 | Thomas et al. | Aug. 19, 1947 |

FOREIGN PATENTS

| Number | Country | Date |
| --- | --- | --- |
| 339,255 | Great Britain | Dec. 1, 1930 |

---

Certificate of Correction

Patent No. 2,500,894　　　　　　　　　　　　　　　　March 14, 1950

DAVID CRAIG

It is hereby certified that error appears in the printed specification of the above numbered patent requiring correction as follows:

Column 2, line 33, after "salts" insert the words and syllable *which ionize in normal solution to give a hy-*;

and that the said Letters Patent should be read with this correction therein that the same may conform to the record of the case in the Patent Office.

Signed and sealed this 4th day of July, A. D. 1950.

[SEAL]

THOMAS F. MURPHY,
*Assistant Commissioner of Patents.*